United States Patent
Owechko

(10) Patent No.: US 10,438,408 B2
(45) Date of Patent: Oct. 8, 2019

(54) RESOLUTION ADAPTIVE MESH FOR PERFORMING 3-D METROLOGY OF AN OBJECT

(71) Applicant: The Boeing Company, Chicago, IL (US)

(72) Inventor: Yuri Owechko, Newbury Park, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/663,190

(22) Filed: Jul. 28, 2017

(65) Prior Publication Data

US 2019/0035150 A1    Jan. 31, 2019

(51) Int. Cl.
| | |
|---|---|
| *G06T 19/20* | (2011.01) |
| *G06T 17/20* | (2006.01) |
| *G01B 11/24* | (2006.01) |
| *G06T 15/08* | (2011.01) |
| *G01B 21/04* | (2006.01) |

(52) U.S. Cl.
CPC ............ *G06T 17/205* (2013.01); *G01B 11/24* (2013.01); *G06T 15/08* (2013.01); *G06T 17/20* (2013.01); *G06T 19/20* (2013.01); *G01B 21/045* (2013.01); *G06T 2215/16* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 8,072,450 B2 | 12/2011 | Chang et al. | |
| 8,983,794 B1 * | 3/2015 | Motzer | G01B 17/06 |
| | | | 702/150 |
| 2002/0167518 A1 | 11/2002 | Migdal et al. | |
| 2005/0140670 A1 | 6/2005 | Wu et al. | |

(Continued)

FOREIGN PATENT DOCUMENTS

FR    2992762 A1    1/2014

OTHER PUBLICATIONS

Kadambi, Achuta, et al.; "Polarized 3D: High-Quality Depth Sensing with Polarization Cues," 2015 IEEE International Conference on Computer Vision, 2015, pp. 3370-3378.

Mahdaoui, Abdelaaziz, et al.; "Comparative Study of Combinatorial 3D Reconstruction Algorithms," International Journal of Engineering Trends and Technology, 2017, pp. 247-251, vol. 48.

(Continued)

*Primary Examiner* — Said Broome
(74) *Attorney, Agent, or Firm* — Sage Patent Group

(57) ABSTRACT

A method for generating a resolution adaptive mesh for 3-D metrology of an object includes receiving point cloud data from a plurality of sensors. The point cloud data from each sensor defines a point cloud that represents the object. Each point cloud includes a multiplicity of points and each point includes at least location information for the point on the object. The method also includes determining a resolution of each sensor in each of three orthogonal dimensions based on a position of each sensor relative to the object and physical properties of each sensor. The method further includes generating a surface representation of the object from the point clouds using the resolutions of each sensor. The surface representation of the object includes a resolution adaptive mesh corresponding to the object for 3-D metrology of the object.

20 Claims, 8 Drawing Sheets

(56) References Cited

U.S. PATENT DOCUMENTS

| | | | |
|---|---|---|---|
| 2006/0142971 A1* | 6/2006 | Reich | G01C 17/00 702/150 |
| 2011/0316978 A1* | 12/2011 | Dillon | G01B 11/2509 348/46 |
| 2012/0301013 A1 | 11/2012 | Gu | |
| 2015/0213646 A1 | 7/2015 | Ma et al. | |
| 2015/0294036 A1 | 10/2015 | Bonner | |
| 2015/0363972 A1 | 12/2015 | Isaksson et al. | |
| 2016/0261844 A1 | 9/2016 | Kadambi et al. | |
| 2017/0004649 A1 | 1/2017 | Collet Romea et al. | |
| 2017/0010087 A1 | 1/2017 | Polidor et al. | |
| 2017/0053438 A1 | 2/2017 | Huang et al. | |
| 2017/0193699 A1 | 7/2017 | Mehr et al. | |

OTHER PUBLICATIONS

European Patent Office; European Search Report for European Application No. 18174588 dated Aug. 15, 2018, 4 Pages.
European Patent Office; Office Action for European Application No. 18173753.7 dated Aug. 30, 2018, 11 Pages.
European Patent Office; Office Action for European Application No. 18174588.6 dated Sep. 10, 2018, 8 Pages.
Eiben, A.E., et al.; "Genetic algorithms with multi-parent recombination," PPSN III: Proceedings of the International Conference on Evolutionary Computation, The Third Conference on Parallel Problem Solving from Nature, 1994, pp. 78-87.
Kennedy, James, et al.; "Particle Swarm Optimization," Proceedings of IEEE International Conference on Neural Networks, IV, 1995, pp. 1942-1948.
Powell, M.J.D.; "An efficient method for finding the minimum of a function of several variables without calculating derivatives," Computer Journal, 7(2), 1964, pp. 155-162.

\* cited by examiner

RESOLUTION ADAPTIVE MESH FOR PERFORMING 3-D METROLOGY OF AN OBJECT

CROSS-REFERENCE TO RELATED APPLICATIONS

This application is related to U.S. application Ser. No. 15/663,243, entitled "Resolution Adaptive Mesh That Is Generated Using an Intermediate Implicit Representation of a Point Cloud," filed the same date as the present application, now U.S. Pat. No. 10,354,444, issued on Jul. 16, 2019, and is incorporated herein by reference.

This application is also related to U.S. application Ser. No. 15/663,397, entitled "Live Metrology of an Object During Manufacturing or Other Operations," filed the same date as the present application and is incorporated herein by reference.

FIELD

The present disclosure relates to performing measurements during factory assembly or other processes on an object being manufactured and more particularly to generate a resolution adaptive mesh for three-dimensional (3-D) metrology of an object being assembled or manufactured.

BACKGROUND

Metrology is the accurate measurement of an object's shape during factory assembly or other processes or for other purposed where accurate measurements are needed. The raw data from 3-D sensors used for metrology is usually in the form of point clouds, or a list of the 3-D coordinates of measured points. Point clouds are difficult to interpret or manipulate, so they are normally converted into a mesh surface representation of the object similar to what is used in computer graphics to represent computer generated objects for display. While many methods have been developed for generating surfaces from point clouds, such as splines or regularized least-squares fitting algorithms, none of these techniques incorporate prior knowledge of how a sensor's accuracy varies with location in viewing direction. 3-D sensors typically have different accuracies in directions along the viewing vector and transverse to the viewing vector, and also for different distances from the measured object. These varying accuracies can lead to increased time and labor in assembling large, complex objects, such as aircraft. Accordingly, there is a need for a system and method for accurately producing a mesh surface representation of an object that take into account these inaccuracies.

SUMMARY

In accordance with an embodiment, a method for generating a resolution adaptive mesh for 3-D metrology of an object includes receiving point cloud data from a plurality of sensors. The point cloud data from each sensor defines a point cloud that represents the object. Each point cloud includes a multiplicity of points and each point includes at least location information for the point on the object. The method also includes determining a resolution of each sensor in each of three orthogonal dimensions based on a position of each sensor relative to the object and physical properties of each sensor. The method further includes generating a surface representation of the object from the point clouds using the resolutions of each sensor. The surface representation of the object includes a resolution adaptive mesh corresponding to the object for 3-D metrology of the object.

In accordance with another embodiment, a system for generating a resolution adaptive mesh for 3-D metrology of an object includes a plurality of sensors for collecting electronic images of an object. The electronic images include 3-D point cloud data of the object. The system also includes a processor and a resolution adaptive mesh module operating on the processor. The resolution adaptive mesh module is configured to perform a set of functions including receiving the point cloud data from each of the plurality of sensors. The point cloud data from each sensor defines a point cloud that represents the object. Each point cloud includes a multiplicity of points and each point includes at least location information for the point on the object. The set of functions also includes determining a resolution of each sensor in each of three orthogonal dimensions based on a position of each sensor relative to the object and physical properties of each sensor. The set of functions further includes generating a surface representation of the object from the point clouds using the resolutions of each sensor. The surface representation of the object includes a resolution adaptive mesh corresponding to the object for 3-D metrology of the object.

In accordance with a further embodiment, a computer program product for generating a resolution adaptive mesh for 3-D metrology of an object includes a computer readable storage medium having program instructions embodied therewith. The computer readable storage medium is not a transitory medium per se. The program instructions are executable by a device to cause the device to perform a method including receiving point cloud data from a plurality of sensors. The point cloud data from each sensor defines a point cloud that represents the object. Each point cloud includes a multiplicity of points and each point includes at least location information for the point on the object. The method also includes determining a resolution of each sensor in each of three orthogonal dimensions based on a position of each sensor relative to the object and physical properties of each sensor. The method further includes generating a surface representation of the object from the point clouds using the resolutions of each sensor. The surface representation of the object includes a resolution adaptive mesh corresponding to the object for 3-D metrology of the object.

In accordance with another embodiment or any of the previous embodiments, generating the surface representation includes fitting a triangular mesh to the point clouds. A contribution of each point in the point clouds in generating the surface representation is based on an accuracy or resolution of each point.

In accordance with another embodiment or any of the previous embodiments, generating the surface representation includes fitting a triangular mesh to the point clouds by weighting a distance of each point from the triangular mesh by an inverse of an expected error standard deviation in a direction from each point to the triangular mesh.

In accordance with another embodiment or any of the previous embodiments, the method or set of functions further includes estimating the expected standard deviation in a direction from each point to the triangular mesh using a plurality of models of resolution for each sensor for different viewing directions and distances. The models of resolution are determined analytically from sensor physical models or empirically from measurement of resolution targets at several different positions that are interpolated to cover an entire measurement volume.

In accordance with another embodiment or any of the previous embodiments, receiving the point cloud data includes receiving the point cloud from each sensor and an uncertainty ellipsoid for each point. The uncertainty ellipsoids are used to determine the resolutions of each sensor based on the position of the sensor relative to the object.

In accordance with another embodiment or any of the previous embodiments, the method or set of functions further includes initializing a triangular mesh using a surface interpolation method to provide an initialized triangular mesh that represents a surface of the object.

In accordance with another embodiment or any of the previous embodiments, the method or set of functions further includes assigning each point to a closest mesh triangle of a triangular mesh. The triangular mesh includes a multiplicity of mesh triangles that collectively represent a surface of the object.

In accordance with another embodiment or any of the previous embodiments, the method or set of functions further includes measuring a distance from each point to a closest point on an assigned mesh triangle and determining a radius of the uncertainty ellipsoid associated with the point in a direction toward the closest point on the assigned mesh triangle for each point.

In accordance with another embodiment or any of the previous embodiments, the method or set of functions further includes forming an objective function for fitting the triangular mesh to the point clouds that automatically selects and uses best point cloud data from the point clouds. The objective function includes a weighted fitting error term and a surface area of a triangular mesh term.

In accordance with another embodiment or any of the previous embodiments, the method or set of functions further includes fitting the triangular mesh to the point clouds by finding positions of vertices of each mesh triangle that minimize the objective function.

In accordance with another embodiment or any of the previous embodiments, the method or set of functions further includes performing rotation and translation operations to register the point clouds to form a composite point cloud. The method or set of functions also includes adding rotation and translation parameters to the objective function and simultaneously registering the point clouds in the composite point cloud and fitting the triangular mesh to the composite point cloud by finding positions of vertices of each mesh triangle that minimize the objective function.

In accordance with another embodiment or any of the previous embodiments, the method or set of functions further includes using particle swarm optimization to minimize the objective function.

In accordance with another embodiment or any of the previous embodiments, the vertices of each mesh triangle are unconstrained.

In accordance with another embodiment or any of the previous embodiments, the vertices of each mesh triangle are constrained with only one direction being variable and another two directions being fixed on a grid.

In accordance with another embodiment or any of the previous embodiments, the method or set of functions further includes fitting the triangular mesh to the point clouds by using multi-resolution mesh fitting. An output triangular mesh of a current level of resolution is subdivided and used as an initial triangular mesh for optimization of a next level of resolution.

In accordance with another embodiment or any of the previous embodiments, the method or set of functions further includes upsampling the point cloud for each level of resolution for use with a subdivided triangular mesh.

The features, functions, and advantages that have been discussed can be achieved independently in various embodiments or may be combined in yet other embodiments further details of which can be seen with reference to the following description and drawings.

DETAILED DESCRIPTION

Figure 1:
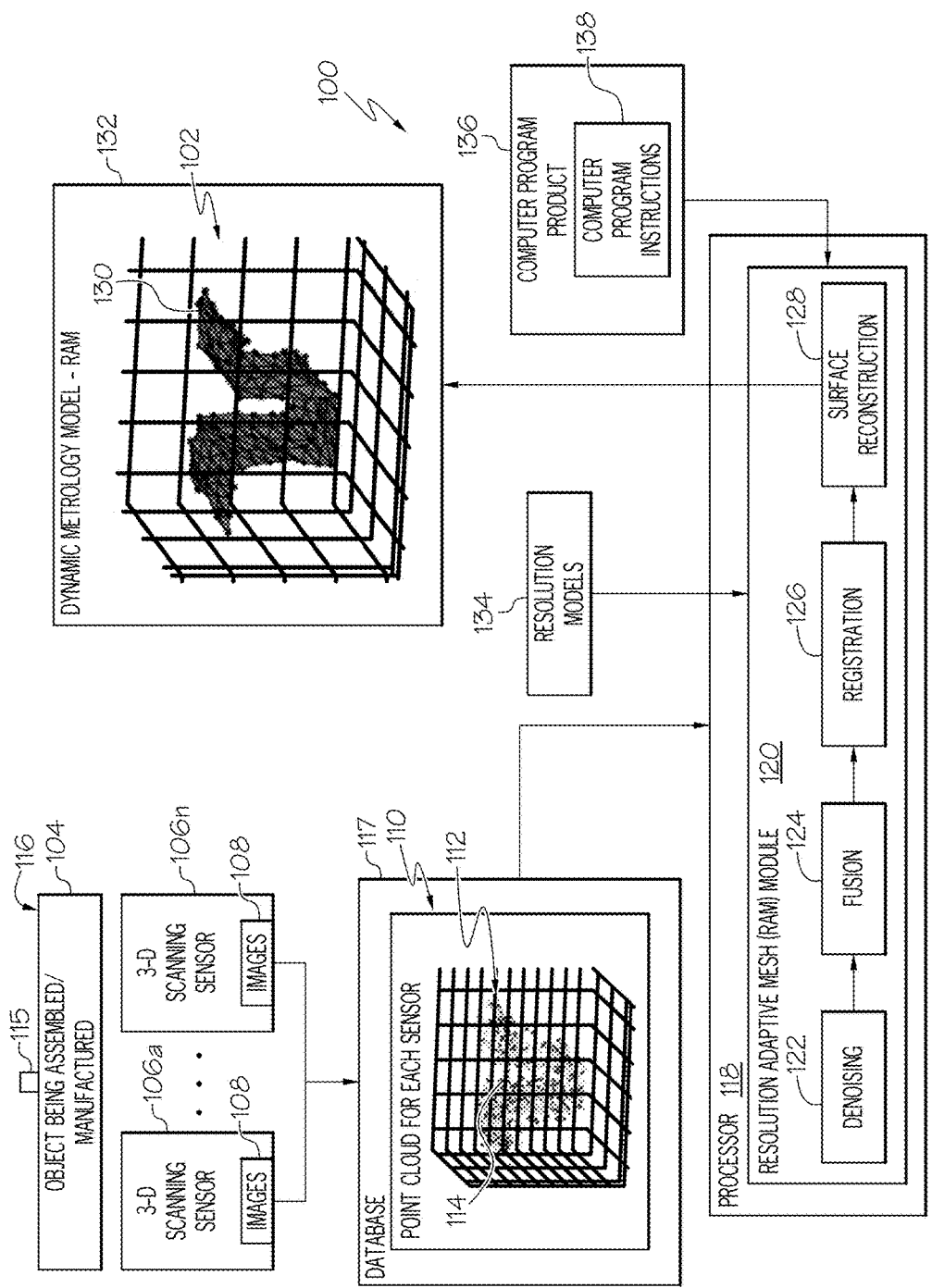
FIG. 1 is a block schematic diagram of an example of system for generating a resolution adaptive mesh for 3-D metrology of an object in accordance with an embodiment of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In accordance with an embodiment, a method and system are provided for representing and optimally combining 3-D point cloud data generated by a 3-D scanning system, and for measuring and tracking objects in large spatial volumes, such as for example, a factory during a manufacturing or assembly process of an object, such as an aircraft. In accordance with an exemplary embodiment, the 3-D scanning system includes a plurality of sensors or 3-D scanning sensors. Each of the 3-D scanning sensors may be any type of 3-D scanning sensor. Examples of a 3-D scanning sensor include but are not limited to a 3-D stereo camera, Light Detection and Ranging (lidar) device or system, or other 3-D scanning device or system. The method converts point clouds into a surface representation useful for metrology while taking into account the spatial varying resolutions in different directions of the plurality of 3-D scanning sensors observing the same object. The method does this by weighting the contribution of each point to the surface representation differently depending on the expected accuracy of the point in the point cloud. This is in contrast to existing surface reconstruction methods that weight all points equally and don't incorporate sensor resolution models or prior knowledge about the expected resolution of the sensors as a function of viewing direction and distance from the object. The method optimizes the 3-D surface representation of the object derived from fusion of the point clouds from the plurality of 3-D scanning sensors observing the same object but from different directions and distances.

FIG. 1 is a block schematic diagram of an example of system 100 for generating a resolution adaptive mesh 102 for 3-D metrology of an object 104 in accordance with an embodiment of the present disclosure. The system 100 includes a plurality of sensors. In accordance with an embodiment, the sensors are 3-D scanning sensors 106a-106n for collecting 3-D electronic images 108 of the object 104. Examples of the sensors or 3-D scanning sensors 106a-106n include but are not necessarily limited to digital cameras, Light Detection and Ranging (lidar) devices, 3-D laser scanning devices, 3-D time-of-flight (ToF) cameras, or similar imaging devices. The 3-D electronic images 108 include 3-D point cloud data 110 of the object 104. The point cloud data 110 from each 3-D scanning sensor 106a-106n defines a point cloud 112 that represents the object 104. Each point cloud 112 includes a multiplicity of points 114 and each point includes at least location information for a corresponding point 115 on a surface 116 of the object 104. The 3-D point cloud data 110 or point clouds 112 from each 3-D scanning sensor 106a-106n are stored in a database 117 or other data storage device. In accordance with an embodiment, the object 104 is an aircraft or portion of an aircraft and the resolution adaptive mesh 102, as described herein, is needed for 3-D metrology of the aircraft or portion of the aircraft during assembly or manufacturing or for some other purpose. In other embodiments, the object 104 is any product or item or portion of a product or item and the resolution adaptive mesh 102, as described herein, is needed to perform 3-D metrology on the device or equipment during assembly, manufacturing or other operation.

The 3-D scanning sensors 106a-106n are located at different locations relative to the object 104 and hence will have different viewing directions of the object 104. The 3-D scanning sensors 106a-106n will have different measurement accuracies and resolutions in directions along a viewing vector to the object 104 and transverse to the viewing vector, and also for different distances from the object 104.

The system 100 also includes a processor 118. A resolution adaptive mesh module 120 for generating the resolution adaptive mesh 102 surface representation of the object 104 is operable on the processor 118. In accordance with an embodiment, the resolution adaptive mesh module 120 includes a point cloud denoising element 122, a point cloud fusion element 124 for combining a plurality of point clouds 112, a registration element 126 for registration of point clouds 112 and a surface reconstruction element 128 for generating a surface representation 130 of the object 104 including the resolution adaptive mesh 102 that is usable for 3-D metrology of the object 104. In accordance with an embodiment described herein, denoising 122, fusion 124 and registration 126 of the point clouds 112 and surface reconstruction 128 are implemented simultaneously during construction of the surface representation 130 of the object 104. The surface reconstruction 128 to generate the surface representation 130 of the object 104 is a dynamic metrology model 132 that is usable for 3-D metrology of the object 104 during assembly or manufacturing because the dynamic metrology model 132 is formed from or includes the resolution adaptive mesh 102 that accounts for the spatially varying resolutions of each of the plurality of 3-D scanning sensors 106a-106n and automatically uses the optimal or best resolution 3-D point cloud data 110 from each 3-D scanning sensor 106a-106n as described in more detail herein.

The resolution adaptive mesh module 120 is configured to perform a set of functions that include receiving 3-D point cloud data 110 from the plurality of 3-D scanning sensors 106a-106n. As previously described, the point cloud data 110 from each 3-D scanning sensor 106a-106n defines a point cloud 112 that represents the object 104. Each point cloud 112 includes a multiplicity of points 114 and each point 114 includes at least location information for the corresponding point 115 on the object 104. The set of functions also includes determining a resolution of each 3-D scanning sensor 106a-106n in each of three orthogonal dimensions based on a position of each 3-D scanning sensor 106a-106n relative to the object 104 and physical properties of each 3-D scanning sensor 106a-106n. The physical properties of the sensors determines the resolution of each sensor in each of the three orthogonal dimensions. Examples of physical properties for a stereo camera sensor include the separation between the cameras, camera focal lengths, and imaging sensor size. Examples of physical properties for a lidar sensor include the optical pulse duration, optical pulse size, optical pulse repetition rate, and lidar rotation rate. The set of functions further includes generating the surface representation 130 of the object 104 from the point clouds 112 using the resolutions of each 3-D scanning sensor 106a-106n. As previously described, the surface representation 130 of the object 104 includes the resolution adaptive mesh 102 corresponding to the object 104 for 3-D metrology of the object 104.

Figure 2A:
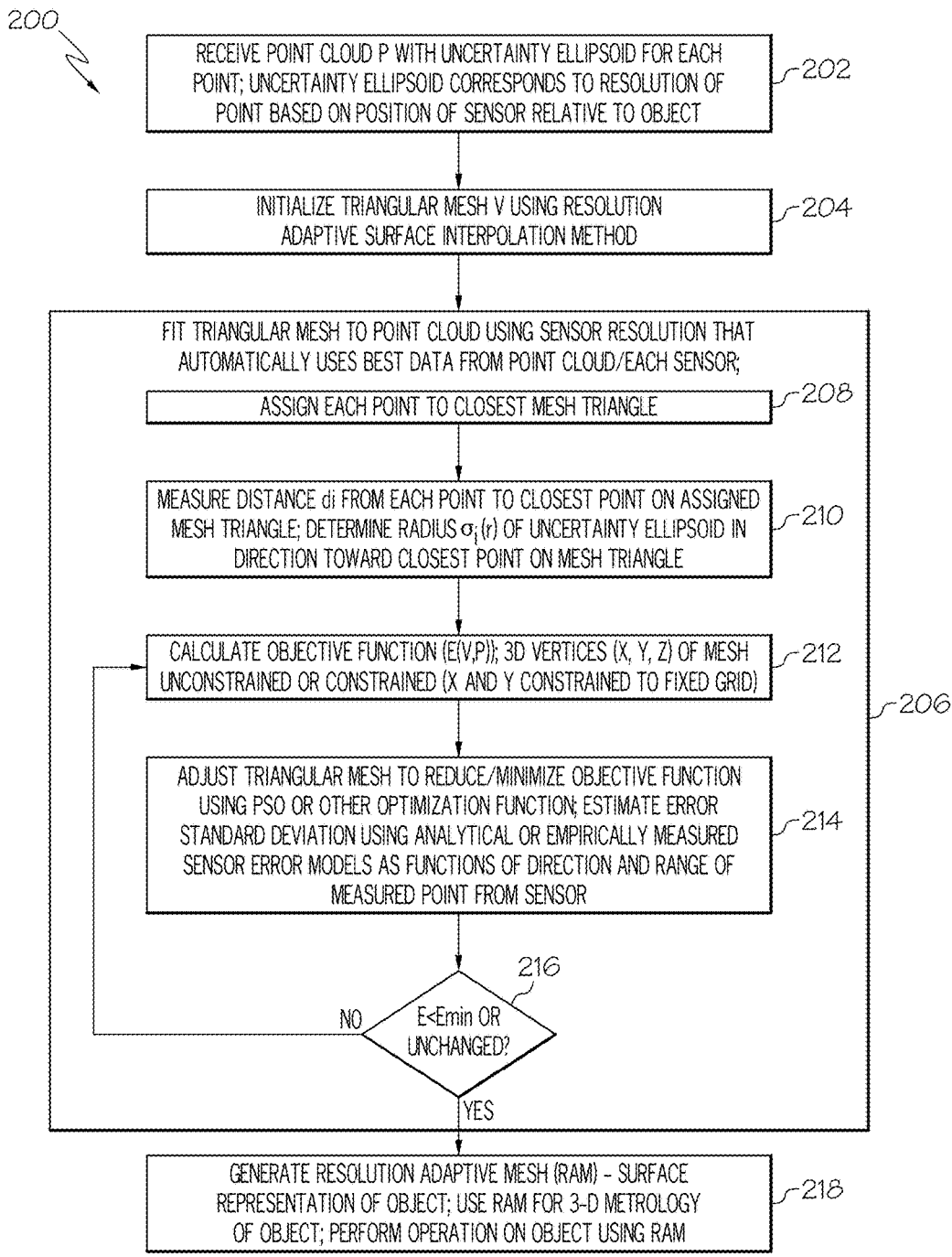
FIG. 2A is a flow chart of an example of a method for generating a resolution adaptive mesh for 3-D metrology of an object in accordance with an embodiment of the present disclosure.
Figure 3:
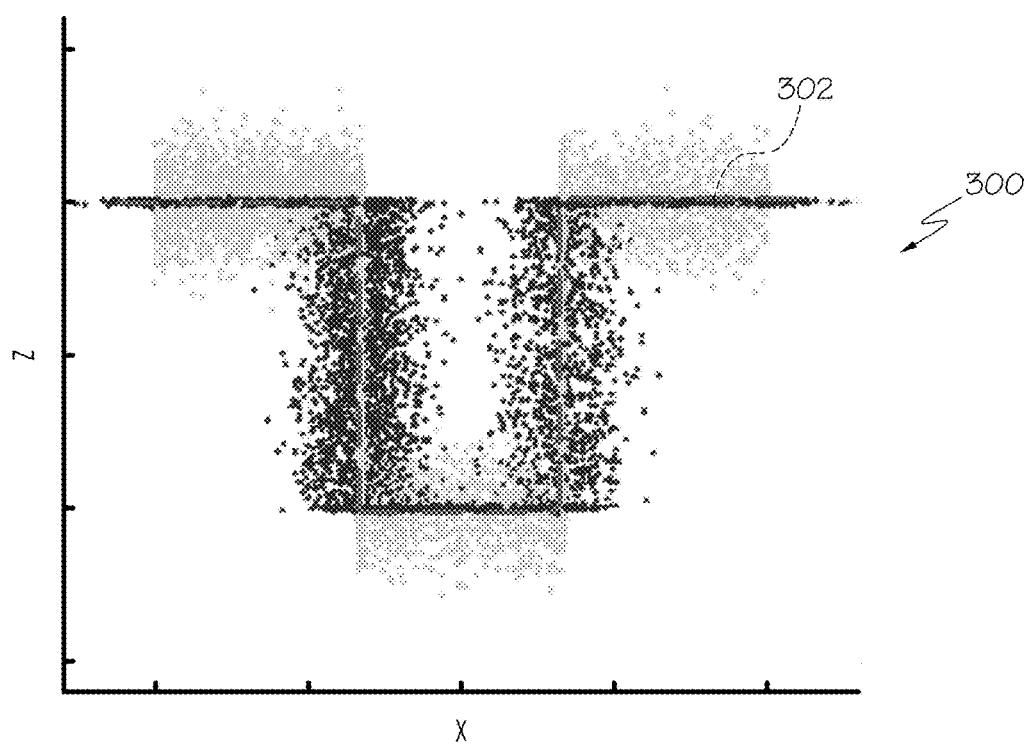
FIG. 3 is an example of a plurality of point clouds in accordance with an embodiment of the present disclosure.
Figure 4:
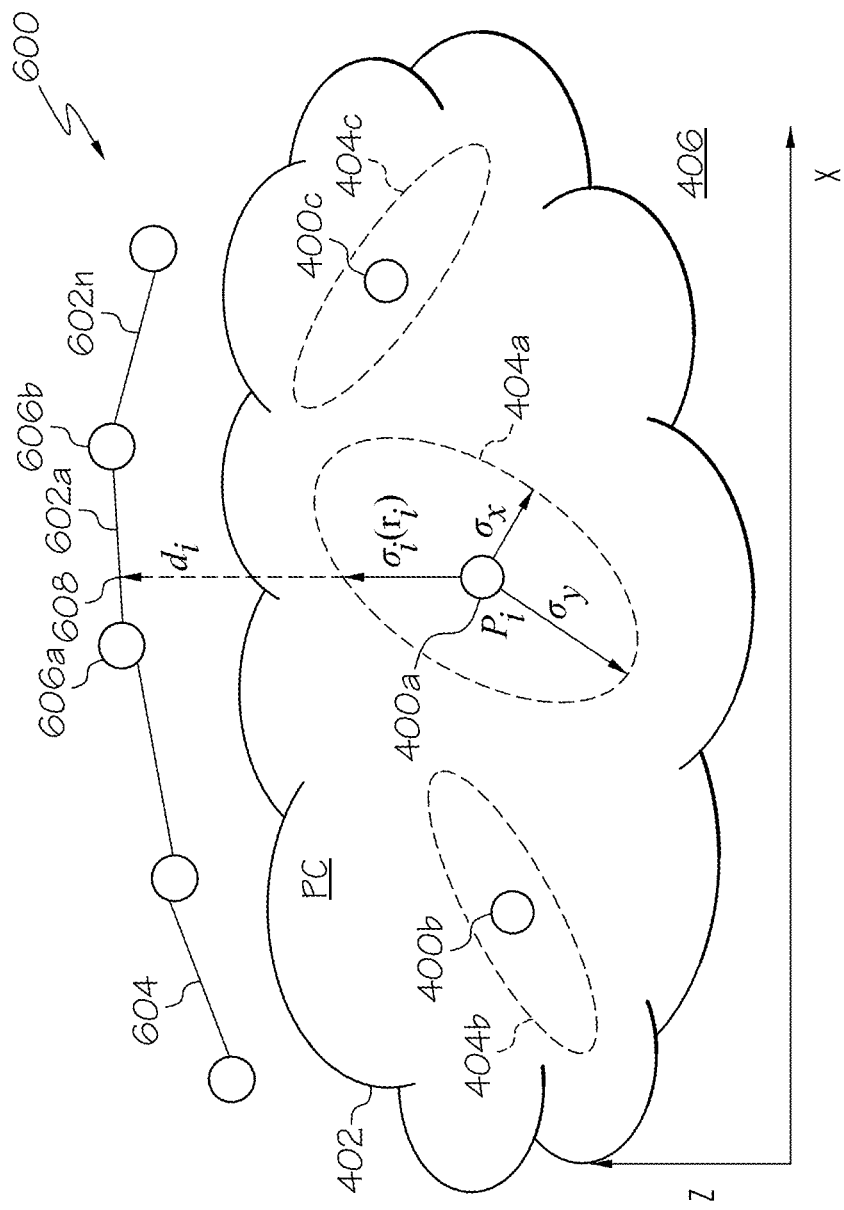
FIG. 4 is an example of measured points in a point cloud and associated uncertainty ellipsoids in accordance with an embodiment of the present disclosure.

FIG. 2A is a flow chart of an example of method 200 for generating a resolution adaptive mesh for 3-D metrology of an object in accordance with an embodiment of the present disclosure. In accordance with an embodiment, the method 200 is embodied in and performed by the resolution adaptive mesh module 120 in FIG. 1. In block 202, point cloud data is received from a plurality of 3-D scanning sensors, such as 3-D scanning sensors 106a-106n in FIG. 1. The point cloud data from each 3-D scanning sensor defines a point cloud that represents the object. Each point cloud includes a multiplicity of points and each point includes at least location information for a corresponding point on the object. The location information includes at least 3-D coordinate information (x, y, z) for the point on the object. Receiving the point cloud data includes receiving the point cloud from each 3-D scanning sensor and an uncertainty ellipsoid for each point. The uncertainty ellipsoids are used to determine the resolution of each 3-D scanning sensor based on the position of the 3-D scanning sensor relative to the object. Referring also to FIGS. 3 and 4, FIG. 3 is an example of a plurality of point clouds 300 of an exemplary object 302 in accordance with an embodiment of the present disclosure. The exemplary object 302 is illustrated by the broken line in FIG. 3. FIG. 4 is an example of measured points $P_i$ (P subscript i) 400a-400c in a point cloud (PC) 402 and corresponding uncertainty ellipsoids 404a-404c in accordance with an embodiment of the present disclosure. The point cloud 402 is the same as one of the point clouds 300 in FIG. 3. The measured points 400a-400c are illustrated in association with 3-D axes x, y, z with the y axis coming out of the page.

Resolutions of each 3-D scanning sensor are determined in each of three orthogonal dimensions (x, y, z) based on a position of each 3-D scanning sensor relative to the object and physical properties of each 3-D scanning sensor. The resolutions for each 3-D scanning sensor for different viewing directions and distances relative to the object are provided by resolution models 134 FIG. 1. The resolution models are determined analytically from sensor physical models or empirically from measurements of resolution targets at several positions that are interpolated to cover the entire measurement volume. Values of resolution or measurement uncertainty are associated with each measured point ($P_i$) 400a-400c in the point cloud 402.

Each measured point ($P_i$) 400a-400c in the point cloud 402 is defined by its position or coordinates and an the associated position-dependent uncertainty ellipsoid 404a-400c as follows:

$$P_i = [x_i, y_i, z_i, \sigma_x, \sigma_y, \sigma_z, \theta, \phi]$$

The uncertainty ellipsoid axes correspond to the resolutions or standard deviations $\sigma_x$, $\sigma_y$, $\sigma_z$, (a subscript x, y, or z) in range and two transverse directions of the measured point (P$_i$) 400a-400c on the object as seen from the 3-D scanning sensor that measured the point (P$_i$) 400a-400c). The orientation of the uncertainty ellipsoid 404a is represented by the two angles θ and φ.

Figure 5:
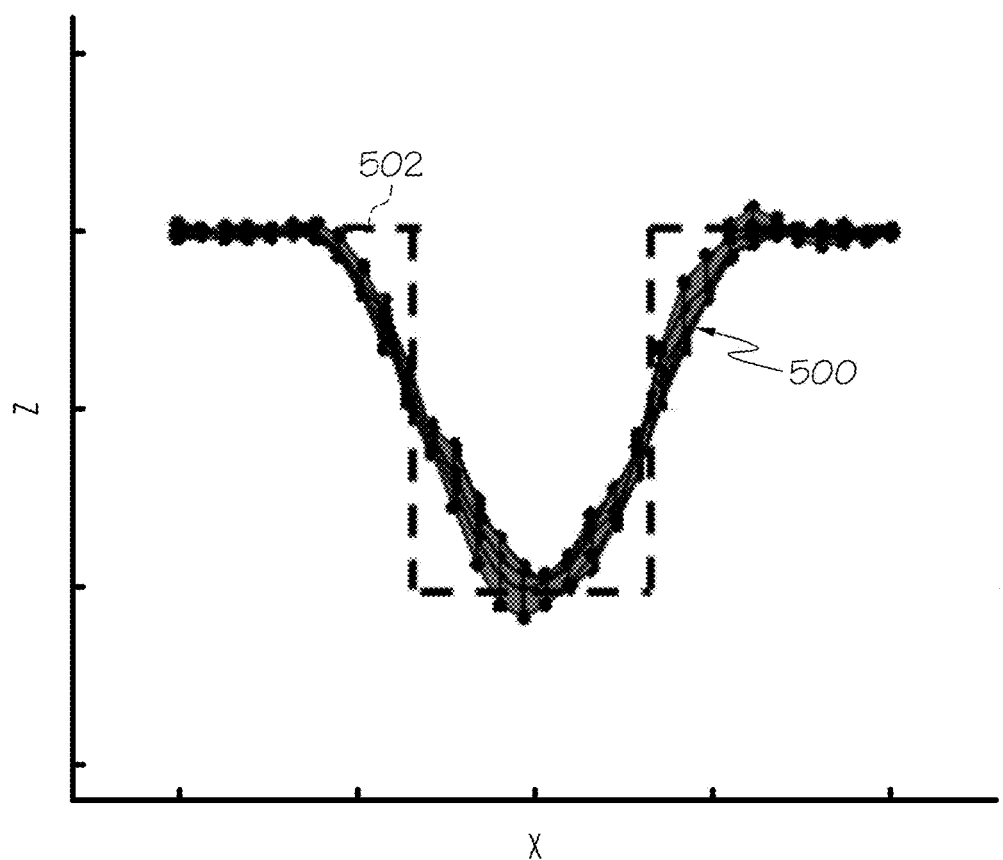
FIG. 5 is an example of initializing a triangular mesh using a surface interpolation method to provide an initialized triangular mesh that represents a surface of the object in accordance with an embodiment of the present disclosure.

In block 204, a triangular mesh V 600 (FIG. 4) is initialized using a surface interpolation method to provide an initialized triangular mesh that represents a surface of the object. In accordance with an embodiment, an example of the surface interpolation method used is Gridfit. Gridfit is an open source Matlab program and is available from The MathWorks, Inc., Natick, Mass. Referring also to FIG. 5, FIG. 5 is an example of initializing a triangular mesh V 600 using a surface interpolation method to provide an initialized triangular mesh 500 that represents a surface 502 of the object. The surface 502 of the object is illustrated by the broken line in FIG. 5. The triangular mesh V 600 is formed from a multiplicity of mesh triangles as described with reference to FIG. 6.

Figure 6:
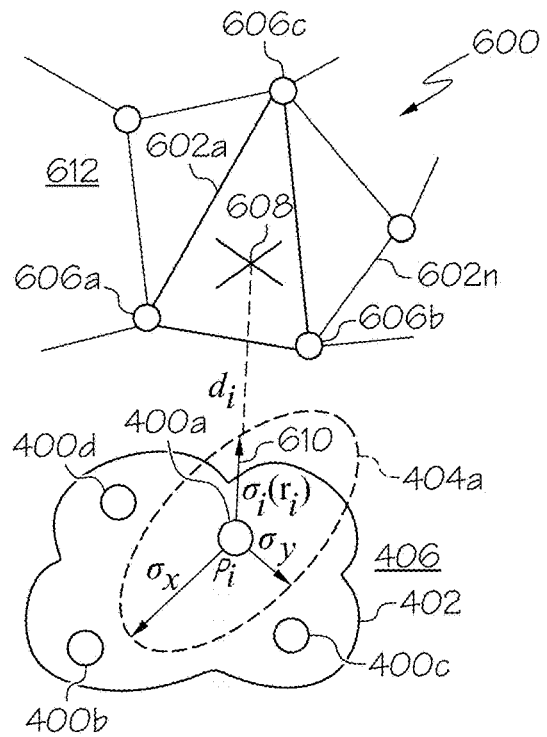
FIG. 6 is an illustration of an example of fitting a triangular mesh to a point cloud in accordance with an embodiment of the present disclosure.

In block 206, the triangular mesh is fit to the point cloud using sensor resolution that automatically uses the best data from each point cloud generated by each 3-D scanning sensor 106a-106n. The best data from each point cloud corresponds to the measured points in the point cloud that have the highest resolution in given directions compared to other nearby measured points in the other point clouds In accordance with an embodiment, blocks 208-216 are elements of block 206. Referring also to FIG. 6, FIG. 6 is an illustration of an example of fitting a triangular mesh V 600 or the initialized triangular mesh 500 to the point cloud 402 in accordance with an embodiment of the present disclosure. The point cloud 402 is the same as one of the point clouds 300 in FIG. 3. A side view of the triangular mesh 600 or initialized triangular mesh 500 is also illustrated in FIG. 4.

In block 208 in FIG. 2A, each measured point P$_i$ 400a in the point cloud 402 is assigned to a closest mesh triangle 602a. The triangular mesh V 600 includes a multiplicity of mesh triangles 602a-602n that collectively represent a surface 604 (FIG. 4) of the object. Each mesh triangle 602a-602n is defined by three vertices 606a-606c (FIG. 6).

In block 210, a distance d$_i$ (d subscript i) is measured from each point P$_i$ 400a toward the closest point 608 on an assigned mesh triangle 602a for each point P$_i$ 400a in the point cloud 402. A direction r$_i$ (r subscript i illustrated by arrow 610) between each point P$_i$ 400a and the closest point 608 on the assigned mesh triangle 602a is also determined. A radius σ$_i$ (r$_i$) (σ subscript i) of the uncertainty ellipsoid 404a associated with the point P$_i$ 400a in the direction r$_i$ to the closest mesh triangle 602a of the triangular mesh V 600 is determined or estimated. The basic idea is to fit the triangular mesh V 600 to the point cloud 402 by adjusting the mesh vertices 606a-606c of each assigned mesh triangle 602a-602n to minimize the mean distance d$_i$ of points 400a in the point cloud 402 from their closest mesh triangles 602a-602n, weighted by the inverse square of the position-dependent sensor resolution in the direction 610 towards the closest point 608 on the assigned mesh triangle 602a-602n. This is done by minimizing an objective function E (V, PC) over the positions of the mesh vertices 606, a 3N dimensional space 612 where N is the number of vertices 606 that form the triangular mesh V 600.

In block 212, an objective function E (V, PC) is determined, formed, or calculated for fitting the triangular mesh V 600 to point cloud data from the point clouds 300 or each point cloud 402. The objective function is represented by Equation 1:

$$E(V, PC) = \frac{1}{M}\sqrt{\sum_{i=1}^{M}\left(\frac{d_i}{\sigma_i(r_i)}\right)^2} + \lambda A_{mesh} \quad \text{Equation 1}$$

The objective function involves determining a norm of the measured point P$_i$ 400a to the triangular mesh 600 distance d$_i$ weighted by 1/σ$_i$ for each measured point P$_i$ 400a. M is the number of measured points Pi in the point cloud PC 402. The objective function also includes a regulation or penalty term proportional to the mesh surface error to prevent undesired solutions where the triangular mesh V 600 folds on itself or extends beyond the point cloud PC 402. The regulation of penalty term includes a weighted fitting error term (λ) and a surface area of a triangular mesh term (A$_{mesh}$) (A subscript mesh).

In accordance with an embodiment, the 3-D vertices 606a-606c of the mesh triangles 602a-602n are unconstrained, that is, the location or position of each of the vertices are not fixed. In another embodiment, the 3-D vertices 606a-606c of the mesh triangles 602a-602n are constrained. For example, the location or position of the vertices 606a-606c in the x and y coordinates are fixed or constrained to a fixed grid 406 and only the z coordinate location or position of each vertex 606a-606c is allowed to vary.

In block 214, the triangular mesh V 600 is fitted to point cloud 402 using sensor resolution that automatically uses the best data from the point cloud 402 or 300 from each 3-D scanning sensor by adjusting the triangular mesh V 600 to reduce or minimize the objective function E(V, PC). In accordance with an embodiment, the objective function E (V, PC) is reduced or minimized using Particle Swarm Optimization (PSO) or other optimization function. Particle Swarm Optimization is described in *Particle Swarm Optimization*, Kennedy, J. and Eberhart, R., "Proceedings of IEEE International Conference on Neural Networks IV," (1995) pp. 1942-1948. In accordance with other embodiments, the objective function E (V, PC) is reduced or minimized by using a generic algorithm, such as *Generic Algorithms with Multi-Parent Recombination*, by Eiben, A. E. et al., "PPSN III: Proceedings of the International Conference on Evolutionary Computation," The Third Conference on Parallel Problem Solving from Nature (1994), pp. 78-87, or Powell's Method, *An efficient Method for Finding the Minimum of a Function for Several Variables without Calculating Derivatives*, by Powell, M. J. D., "Computer Journal 7 (2)" (1964), pp. 155-162.

In block 216, a determination is made whether the objective function E (V, PC) is less than a preset minimum value E$_{min}$ (E subscript min) or is unchanged in the last few iterations. If the objective functions E (V, PC) is not less than the preset minimum value, the method 200 returns to block 212 and another iteration is performed to further reduce or minimize the objective function E (V, PC). If the objective function E (V, PC) is less than the preset minimum value E$_{min}$ or unchanged over the last few iterations, the method 200 advances to block 218.

In block 218, a surface representation of the object is generated or provided for 3-D metrology of the object. As described above, the surface representation of the object is generated from the point clouds using the resolution of each 3-D scanning sensor. The surface representation of the object includes a resolution adaptive mesh corresponding to the object for 3-D metrology of the object. In accordance with an embodiment, an operation, such as a manufacturing operation, is performed on the object using the surface representation of the object including the resolution adaptive mesh. Accordingly, the surface representation includes fitting the triangular mesh to the point clouds, wherein a contribution of each measured point in the point clouds in generating the surface representation is based on an accuracy or resolution of each measured point. Minimizing or reducing the objective function E (V, PC) for generating the surface representation includes fitting the triangular mesh V to the point clouds by weighting the distance $d_i$ of each measured point $P_i$ from the triangular mesh V by an inverse of an expected error standard deviation $(1/\sigma_i)$ in a direction $r_i$ from each point $P_i$ to the triangular mesh V. The triangular mesh V is fitted to the point clouds by finding positions of vertices 606a-606c of each mesh triangle 602a-602n that minimize the objective function E (V, PC).

Figure 2B:
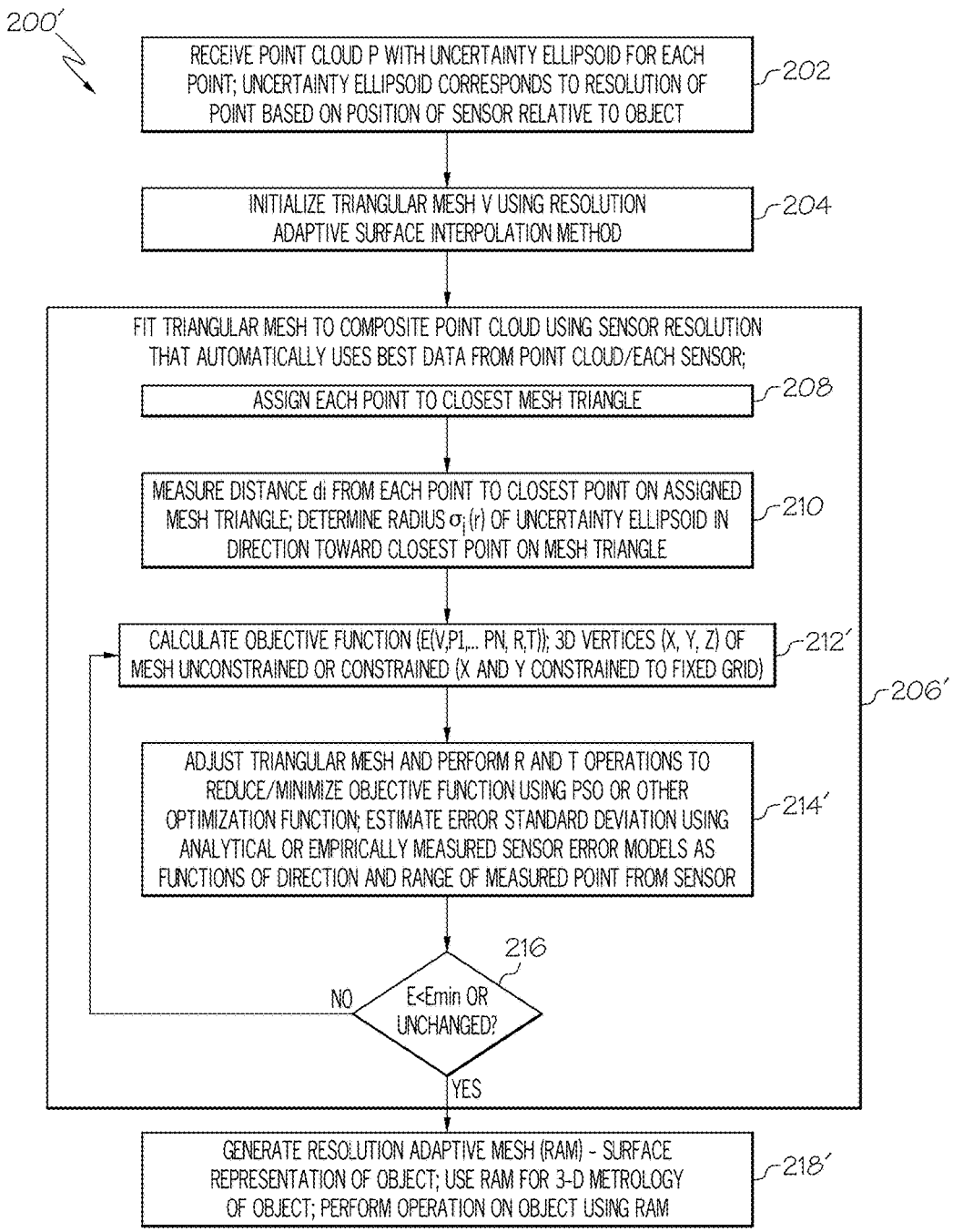
FIG. 2B is a flow chart of an example of a method for generating a resolution adaptive mesh for 3-D metrology of an object in accordance with another embodiment of the present disclosure.

FIG. 2B is a flow chart of an example of method 200' for generating a resolution adaptive mesh for 3-D metrology in accordance with another embodiment of the present disclosure. The method 200' is similar to the method 200 except in block 212' calculating or determining the objective function (E (V, P1, . . . , Pn, R, T) includes performing rotation and translation operations to register the plurality of point clouds to form a composite point cloud. Rotation and translation parameters are added to the objective function. The point clouds are simultaneously registered in a composite point cloud. The triangular mesh is fitted to the composite point cloud by finding positions of vertices of each mesh triangle that minimize the objective function similar to that previously described. In block 214', the triangular mesh is adjusted and rotation and translation operations are performed to reduce or minimize the objective function. In accordance with an embodiment, particle swarm optimization is used to minimize the objective function similar to that previously described.

Figure 7:
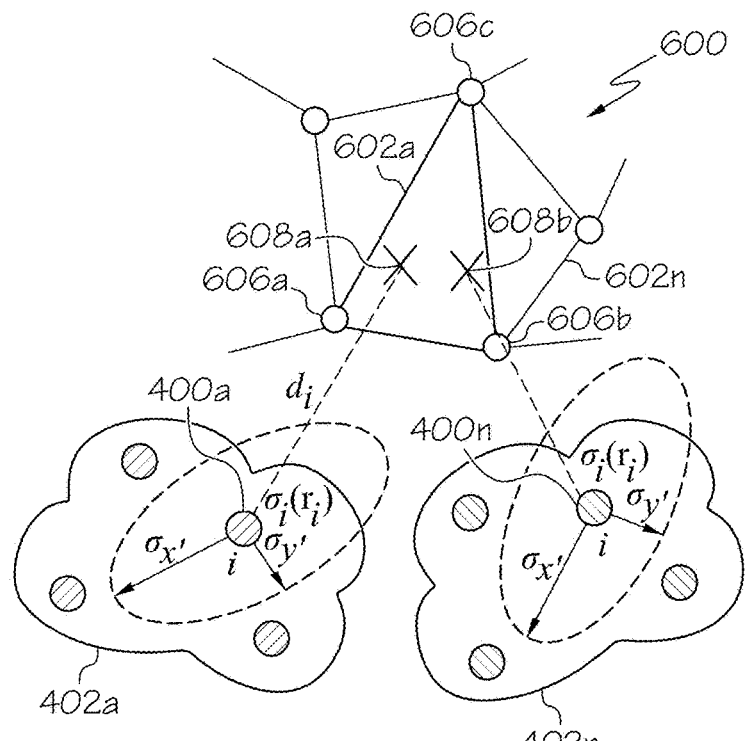
FIG. 7 is an illustration of an example of simultaneous fusion and registration of multiple point clouds for fitting a triangular mesh to a composite point cloud in accordance with an embodiment of the present disclosure.

Referring also to FIG. 7, FIG. 7 is an illustration of an example of simultaneous fusion and registration of multiple point clouds 402a-402n for fitting a triangular mesh 600 to a composite point cloud (block 206' in FIG. 6) in accordance with an embodiment of the present disclosure. The plurality of point clouds 402a-402n are registered in a common coordinate system by adding an additional six dimensions to the solution space that corresponds to rotation and translation of one point cloud coordinate system relative to another. The residual modeling error of the triangular mesh for a composite point cloud consisting of two point clouds from different 3-D scanning sensors that observe the same object is minimized when the two point clouds are registered. Therefore, the resolution adaptive mesh process described herein is used to both register multiple point clouds and generate a resolution adaptive mesh for the combined or composite point cloud similar to that described above. The solution space dimensionality increases from 3N to 3N+6 where N is the number of vertices 606a-606c in the triangular mesh V 600 and the additional 6 dimensions are coordinate rotation and translation parameters. Accordingly, the objective function for an example of two point clouds becomes:

$$E(V, \alpha, \beta, \theta, T_x, T_y, T_z, P_1, P_2) = \frac{1}{M} \sqrt{\sum_{i=1}^{M} \left(\frac{d_i}{\sigma_i(r_i)}\right)^2} + \lambda A_{mesh}$$

The parameters $\alpha$, $\beta$, and $\theta$ are the angles for rotating a point cloud P1 relative to another point cloud P2, or vice versa.

Where the point cloud coordinate matrix for N points is:

$$P = \begin{pmatrix} x_1 & x_2 & \ldots & x_N \\ y_1 & y_2 & \ldots & y_N \\ z_1 & z_2 & \ldots & z_N \end{pmatrix}$$

The matrix operator that rotates the point cloud about three axes is:

$$R = \begin{pmatrix} \cos\theta & \sin\theta & 0 \\ -\sin\theta & \cos\theta & 0 \\ 0 & 0 & 1 \end{pmatrix} \begin{pmatrix} \cos\beta & 0 & \sin\beta \\ 0 & 1 & 0 \\ -\sin\beta & 0 & \cos\beta \end{pmatrix} \begin{pmatrix} 1 & 0 & 0 \\ 0 & \cos\alpha & \sin\alpha \\ 0 & -\sin\alpha & \cos\alpha \end{pmatrix}$$

The 3×N matrix that translates the point cloud is:

$$T = \begin{pmatrix} \Delta x & \Delta x & \ldots \Delta x \\ \Delta y & \Delta y & \ldots \Delta y \\ \Delta z & \Delta z & \ldots \Delta z \end{pmatrix}$$

The rotated and translated point cloud is then determined by:

$$P' = RP + T$$

In accordance with an embodiment, each of the point clouds of a plurality of point clouds are rotated and translated to form a combined or composite point cloud which is then fitted to a triangular mesh similar to that previously described.

In block 218', a surface representation of the object is generated or provided for 3-D metrology of the object. The surface representation of the object is generated from the combined point clouds or the composite point cloud and using the resolution of each 3-D scanning sensor similar to that previously described. The surface representation of the object includes a resolution adaptive mesh corresponding to the object for 3-D metrology of the object.

Figure 8:
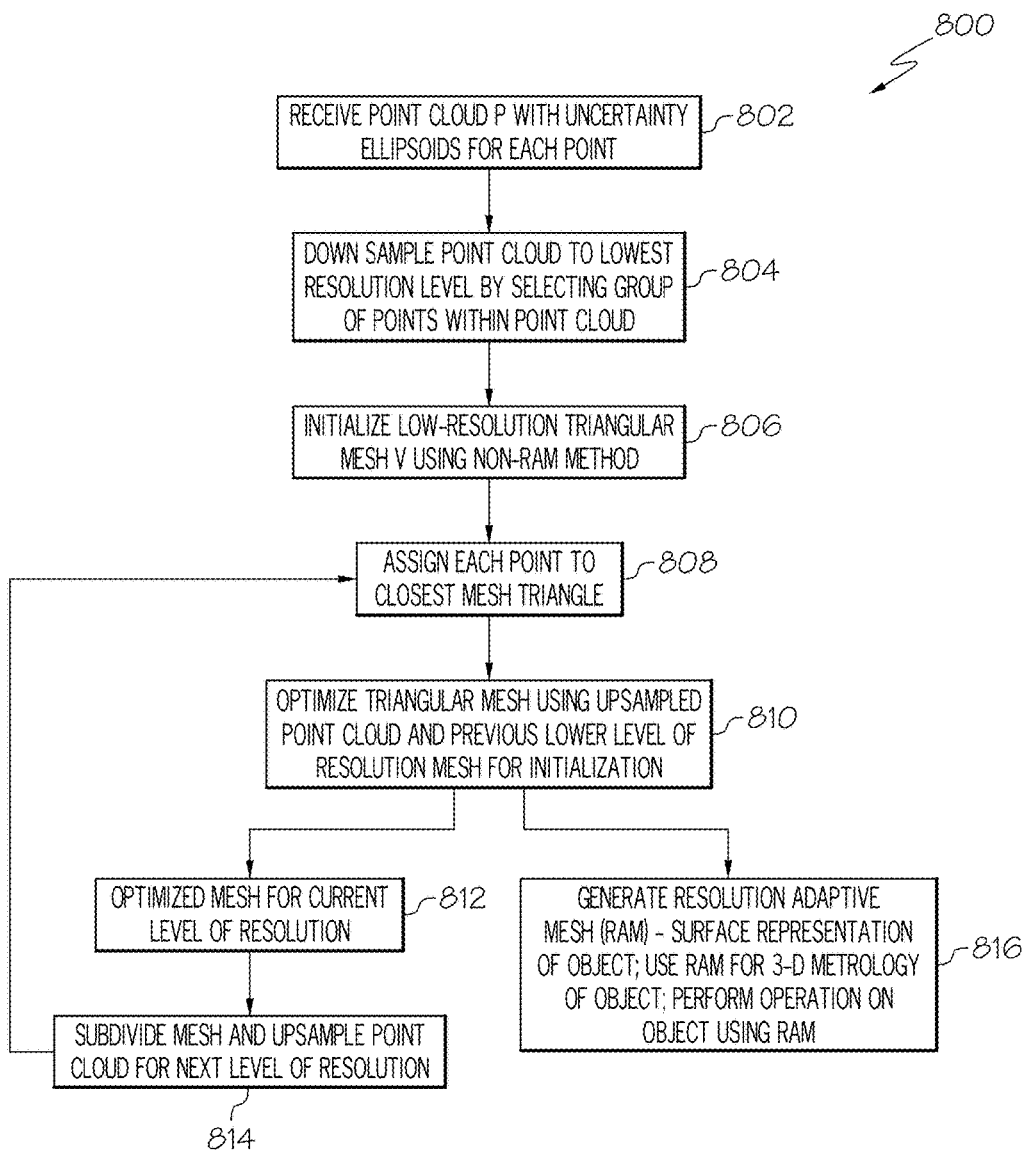
FIG. 8 is a flow chart of an example of method for generating a resolution adaptive mesh for 3-D metrology using multi-resolution fitting in accordance with an embodiment of the present disclosure.

FIG. 8 is a flow chart of an example of method 800 for generating a resolution adaptive mesh for 3-D metrology using multi-resolution fitting in accordance with an embodiment of the present disclosure. In accordance with an embodiment, the method 800 is embodied and performed by the resolution adaptive mesh module 120 in FIG. 1. The method 800 includes fitting the triangular mesh to the point clouds by using multi-resolution mesh fitting, wherein an output triangular mesh of a current level of resolution is subdivided and used as an initial triangular mesh for optimization of a next level of resolution.

In block 802, point cloud data is received from a plurality of 3-D scanning sensors. The point cloud data from each 3-D scanning sensor defines a point cloud that represents an object, such as object 104 in FIG. 1. Each point cloud includes a multiplicity of points and each point includes at least location information for the point on the object. The location information includes at least 3-D coordinate information (x, y, z) for the point on the object. Receiving the point cloud data includes receiving the point cloud from each 3-D scanning sensor and an uncertainty ellipsoid for each point. The uncertainty ellipsoids are used to determine the resolution of each 3-D scanning sensor based on the position of each 3-D scanning sensor relative to the object and physical properties of each 3-D scanning sensor.

In block 804, each point cloud is down sampled to a lowest resolution level by selecting a group of points within each point cloud. In accordance with an embodiment, the group of points are selected randomly. In accordance with another embodiment, an adaptive approach is used where the probability of selecting a certain point is higher if a point density or number of points clustered around the certain point is lower than other points in the point cloud, since the certain point is more "valuable" in providing location information for generating a resolution adaptive mesh representation of the object than points in high density regions of the point cloud.

In block 806, a low-resolution triangular mesh is initialized using a non-resolution adaptive mesh (RAM) method. In accordance with an exemplary embodiment, Gridfit is used to initialize the low-resolution triangular mesh.

In block 808, each down sampled point is assigned to a closest mesh triangle in the initialized triangular mesh. In block 810, the triangular mesh is optimized using an upsampled point cloud and the previous lower level of resolution mesh for initialization to generate an optimized mesh 812 for the current level of resolution. The upsampled point cloud is generated using the subdivided mesh in block 814. The upsampled points are generated to lie on the smaller triangles in the subdivided mesh.

In block 814, the triangular mesh is subdivided and the point cloud is upsampled for the next level of resolution. The method 800 then returns to block 808 and the method continues similar to that previously described until the desired level of resolution is obtained in block 810. When the desired level of resolution is obtained, the method 800 advances to block 816.

In block 816, the resolution adaptive mesh is generated or provided that is a surface representation of the object. The resolution adaptive mesh is used for 3-D metrology of the object. In accordance with an embodiment, an operation, such as a manufacturing operation is performable on the object using the resolution adaptive mesh.

In accordance with an embodiment, either of the method 200, 200' or 800 are embodied on a computer program product, such as computer program product 136 in FIG. 1. The computer program product 136 includes a computer readable storage medium similar to that previously described having computer program instructions 138 embodied therewith. The computer readable storage medium is not a transitory medium per se. The program instructions are executable by a device, such as processor 118 in FIG. 1 to cause the device to perform the method 200, 200' or 800. In accordance with an embodiment, the computer program instructions 138 define the resolution adaptive mesh module 120 which is stored on a storage device in association with the processor 118 and are downloadable from the computer program product 136.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to embodiments in the form disclosed. Many modifications and variations will be apparent to those of ordinary skill in the art without departing from the scope and spirit of embodiments.

Although specific embodiments have been illustrated and described herein, those of ordinary skill in the art appreciate that any arrangement which is calculated to achieve the same purpose may be substituted for the specific embodiments shown and that the embodiments have other applications in other environments. This application is intended to cover any adaptations or variations. The following claims are in no way intended to limit the scope of embodiments of the disclosure to the specific embodiments described herein.

What is claimed is:

1. A method for generating a resolution adaptive mesh for 3-D metrology of an object, comprising:
    receiving, by a processor, point cloud data from a plurality of sensors, the point cloud data from each sensor defining a point cloud that represents the object, wherein each point cloud comprises a multiplicity of points and each point comprises at least location information for the point on the object;
    determining, by the processor, a resolution of each sensor in each of three orthogonal dimensions based on a position of each sensor relative to the object and physical properties of each sensor; and
    generating, by the processor, a surface representation of the object from the point clouds using the resolutions of each sensor, the surface representation of the object comprising a resolution adaptive mesh corresponding to the object for 3-D metrology of the object.

2. The method of claim 1, wherein generating the surface representation comprises fitting a triangular mesh to the point clouds, wherein a contribution of each point in the point clouds in generating the surface representation is based on an accuracy or resolution of each point.

3. The method of claim 1, wherein generating the surface representation comprises fitting a triangular mesh to the point clouds by weighting a distance of each point from the triangular mesh by an inverse of an expected error standard deviation in a direction from each point to the triangular mesh.

4. The method of claim 3, further comprising estimating the expected standard deviation in a direction from each point to the triangular mesh using a plurality of models of resolution for each sensor for different viewing directions and distances, the models of resolution are determined analytically from sensor physical models or empirically from measurement of resolution targets at several different positions that are interpolated to cover an entire measurement volume.

5. The method of claim 1, wherein receiving the point cloud data comprises receiving the point cloud from each sensor and an uncertainty ellipsoid for each point, wherein the uncertainty ellipsoids are used to determine the resolutions of each sensor based on the position of the sensor relative to the object.

6. The method of claim 5, further comprising initializing a triangular mesh using a surface interpolation method to provide an initialized triangular mesh that represents a surface of the object.

7. The method of claim 5, further comprising assigning each point to a closest mesh triangle of a triangular mesh, the triangular mesh comprising a multiplicity of mesh triangles that collectively represent a surface of the object.

8. The method of claim 7, further comprising:
measuring a distance from each point to a closest point on an assigned mesh triangle; and
determining a radius of the uncertainty ellipsoid associated with the point in a direction toward the closest point on the assigned mesh triangle for each point.

9. The method of claim 8, further comprising forming an objective function for fitting the triangular mesh to the point clouds that automatically selects and uses best point cloud data from the point clouds, the objective function comprising a weighted fitting error term and a surface area of a triangular mesh term.

10. The method of claim 9, further comprising fitting the triangular mesh to the point clouds by finding positions of vertices of each mesh triangle that minimize the objective function.

11. The method of claim 10, further comprising:
performing rotation and translation operations to register the point clouds to form a composite point cloud;
adding rotation and translation parameters to the objective function and
simultaneously registering the point clouds in the composite point cloud and fitting the triangular mesh to the composite point cloud by finding positions of vertices of each mesh triangle that minimize the objective function.

12. The method of claim 10, further comprising using particle swarm optimization to minimize the objective function.

13. The method of claim 10, wherein the vertices of each mesh triangle are unconstrained.

14. The method of claim 10, wherein the vertices of each mesh triangle are constrained with only one direction being variable and another two directions being fixed on a grid.

15. The method of claim 7, further comprising fitting the triangular mesh to the point clouds by using multi-resolution mesh fitting, wherein an output triangular mesh of a current level of resolution is subdivided and used as an initial triangular mesh for optimization of a next level of resolution.

16. The method of claim 15, further comprising upsampling the point cloud for each level of resolution for use with a subdivided triangular mesh.

17. A system for generating a resolution adaptive mesh for 3-D metrology of an object, comprising:
a plurality of sensors for collecting electronic images of an object, the electronic images comprising 3-D point cloud data of the object;
a processor; and
a resolution adaptive mesh module operating on the processor, the resolution adaptive mesh module being configured to perform a set of functions comprising:
receiving the point cloud data from the plurality of sensors, the point cloud data from each sensor defining a point cloud that represents the object, wherein each point cloud comprises a multiplicity of points and each point comprises at least location information for the point on the object;
determining a resolution of each sensor in each of three orthogonal dimensions based on a position of each sensor relative to the object and physical properties of each sensor; and
generating a surface representation of the object from the point clouds using the resolutions of each sensor, the surface representation of the object comprising a resolution adaptive mesh corresponding to the object for 3-D metrology of the object.

18. The system of claim 17, wherein the set of functions further comprises generating the surface representation comprises fitting a triangular mesh to the point clouds, wherein a contribution of each point in the point clouds in generating the surface representation is based on an accuracy or resolution of each point.

19. A computer program product for generating a resolution adaptive mesh for 3-D metrology of an object, the computer program product comprising a computer readable storage medium having program instructions embodied therewith, wherein the computer readable storage medium is not a transitory medium per se, the program instructions being executable by a device to cause the device to perform a method comprising:
receiving point cloud data from a plurality of sensors, the point cloud data from each sensor defining a point cloud that represents the object, wherein each point cloud comprises a multiplicity of points and each point comprises at least location information for the point on the object;
determining a resolution of each sensor in each of three orthogonal dimensions based on a position of each sensor relative to the object and physical properties of each sensor; and
generating a surface representation of the object from the point clouds using the resolutions of each sensor, the surface representation of the object comprising a resolution adaptive mesh corresponding to the object for 3-D metrology of the object.

20. The computer program product of claim 19, wherein the method further comprises generating the surface representation comprises fitting a triangular mesh to the point clouds, wherein a contribution of each point in the point clouds in generating the surface representation is based on an accuracy or resolution of each point.

* * * * *